US006894254B2

(12) United States Patent
Hauschulz

(10) Patent No.: US 6,894,254 B2
(45) Date of Patent: May 17, 2005

(54) HEATER CONTROL SYSTEM WITH COMBINATION MODULAR AND DAISY CHAINED CONNECTIVITY AND OPTIMUM ALLOCATION OF FUNCTIONS BETWEEN BASE UNIT AND LOCAL CONTROLLER MODULES

(75) Inventor: Dana S. Hauschulz, Boulder, CO (US)

(73) Assignee: MKS Instruments, Inc., Wilmington, MA (US)

( * ) Notice: Subject to any disclaimer, the term of this patent is extended or adjusted under 35 U.S.C. 154(b) by 328 days.

(21) Appl. No.: 09/907,494

(22) Filed: Jul. 16, 2001

(65) Prior Publication Data

US 2002/0008101 A1 Jan. 24, 2002

Related U.S. Application Data

(63) Continuation-in-part of application No. 09/553,416, filed on Apr. 20, 2000, now abandoned.

(51) Int. Cl.[7] .................................................. H05B 1/02
(52) U.S. Cl. ........................ 219/506; 219/483; 219/486; 219/494; 219/508; 307/41
(58) Field of Search ................................ 219/506, 505, 219/483–486, 501, 494, 507–510, 497; 307/38–41, 117, 118

(56) References Cited

U.S. PATENT DOCUMENTS

| 3,675,046 A | 7/1972 | Harkenrider et al. |
| 3,679,871 A | 7/1972 | Evalds |
| 3,689,886 A | 9/1972 | Durkee |
| 3,752,956 A | 8/1973 | Cahill et al. |
| 3,789,190 A | 1/1974 | Orosy et al. |
| 3,796,977 A | 3/1974 | Elliott et al. |
| 3,869,597 A | 3/1975 | Strange |
| 4,086,466 A | 4/1978 | Scharlack |
| 4,237,369 A | * 12/1980 | Jones .......................... 219/503 |
| 4,268,818 A | 5/1981 | Davis et al. |
| 4,290,056 A | 9/1981 | Chow |
| 4,329,569 A | 5/1982 | Hjortsberg et al. |
| 4,400,688 A | 8/1983 | Johnston et al. |
| 4,418,333 A | 11/1983 | Schwarzbach et al. |
| 4,446,462 A | 5/1984 | Ouellette et al. |
| 4,474,825 A | 10/1984 | Schmidt |
| 4,506,146 A | 3/1985 | Rice et al. |
| 4,507,546 A | 3/1985 | Fortune et al. |
| 4,540,875 A | * 9/1985 | Buttolph, III ............... 219/364 |

(Continued)

Primary Examiner—Mark Paschall
(74) Attorney, Agent, or Firm—Cochran Freund & Young LLC; James R. Young

(57) ABSTRACT

A heater control system that utilizes electronic temperature control at each of a number of interconnected heaters is provided for monitoring and operating heaters within a narrow temperature range. In one embodiment, a heater control system is provided that is adapted for controlling a number of heaters positioned on pipe and components of a piping system from a remote location. The heater control system includes satellite controllers mounted on each heater connected daisy chain fashion and includes a monitoring station with a user interface for allowing a user to monitor and to remotely control the operating status or temperature of each heater in the heater control system. To satisfy the user's space requirements, the size of each controller is maintained at a small form factor and a single cord is used to provide power and communications lines to and between the controllers. Each controller integrates power supply and control with electronic temperature control to minimize the use of mechanical switching and to increase the accuracy of temperature control. The temperature set point is adjustable at each controller and, in one embodiment, the temperature set point is remotely adjustable from a remote monitoring station. The operating status of each controller is displayed on the exterior of the controller's housing and in one embodiment, the operating status, such as temperature, is displayed at a base station for each line of controllers and heaters and on a user interface monitor at a monitoring station.

23 Claims, 10 Drawing Sheets

U.S. PATENT DOCUMENTS

| | | | |
|---|---|---|---|
| 4,549,073 A | | 10/1985 | Tamura et al. |
| 4,635,040 A | | 1/1987 | Masot |
| 4,636,619 A | | 1/1987 | Sugimori |
| 4,638,850 A | * | 1/1987 | Newell, III .................. 165/26 |
| 4,673,127 A | | 6/1987 | Grant |
| 4,694,145 A | | 9/1987 | Romstadt et al. |
| 4,697,166 A | | 9/1987 | Warnagiris et al. |
| 4,737,769 A | | 4/1988 | Masot |
| 4,778,980 A | | 10/1988 | Rathbun |
| 4,864,274 A | | 9/1989 | Black |
| 4,874,925 A | | 10/1989 | Dickenson |
| 4,950,872 A | | 8/1990 | Chen |
| 4,994,792 A | | 2/1991 | Ziegler, Jr. |
| 5,015,826 A | * | 5/1991 | Curti ......................... 219/492 |
| 5,021,634 A | | 6/1991 | Santoro et al. |
| 5,022,459 A | | 6/1991 | Chiles et al. |
| 5,031,082 A | | 7/1991 | Bierend |
| 5,120,936 A | | 6/1992 | Shyu et al. |
| 5,128,653 A | | 7/1992 | Yuchi |
| 5,196,830 A | | 3/1993 | Birging et al. |
| 5,225,811 A | | 7/1993 | Audy |
| 5,463,375 A | | 10/1995 | Bauer |
| 5,464,965 A | | 11/1995 | McGregor et al. |
| 5,550,350 A | | 8/1996 | Barnes |
| 5,566,879 A | | 10/1996 | Longtin |
| 5,600,306 A | | 2/1997 | Ichikawa et al. |
| 5,632,919 A | | 5/1997 | MacCracken et al. |
| 5,658,480 A | | 8/1997 | Tennant et al. |
| 5,667,712 A | | 9/1997 | Sutorius et al. |
| 5,689,230 A | | 11/1997 | Merwin et al. |
| 5,694,108 A | | 12/1997 | Shuey |
| 5,708,256 A | | 1/1998 | Montagnino et al. |
| 5,789,722 A | | 8/1998 | Zimmerman et al. |
| 5,791,377 A | | 8/1998 | LaRochelle |
| 5,900,179 A | | 5/1999 | Bilenko et al. |
| 6,023,052 A | * | 2/2000 | Carl, Jr. et al. ............. 219/483 |
| 6,142,974 A | | 11/2000 | Kistner et al. |

\* cited by examiner

HEATER CONTROL SYSTEM WITH COMBINATION MODULAR AND DAISY CHAINED CONNECTIVITY AND OPTIMUM ALLOCATION OF FUNCTIONS BETWEEN BASE UNIT AND LOCAL CONTROLLER MODULES

CROSS-REFERENCE TO RELATED APPLICATIONS

This patent application is a continuation-in-part of U.S. patent application Ser. No. 09/553,416, filed Apr. 20, 2000 now abandoned.

BACKGROUND OF THE INVENTION

1. Field of the Invention

The present invention relates generally to a system for controlling and monitoring the temperature of heaters, and more particularly, to a heater control system for a plurality of individual pipe heaters positioned adjacent each other on a pipe with a like number of controller modules, which are configured for daisy chain connection together and for individual connection to individual mounting on and pipe heaters to provide individual electronic temperature and power control at each of the pipe heaters.

2. Description of the Related Art

The use of pipe heaters is widespread in semiconductor manufacturing, chemical, and pharmaceutical processing, plastics manufacturing, food processing, and other industries to heat piping systems to control various production and waste processes. Typically, the temperature of the piping system must be kept within a certain temperature range to keep gases or liquids flowing in the pipes at desired temperature levels as they are transported from one place to another. For example, in the semiconductor manufacturing industry, flexible insulated heaters, such as those disclosed in U.S. Pat. No. 5,714,738 to Hauschulz et al., are installed along the length of piping and piping components downstream from a reaction or deposition chamber to maintain transported effluent gases and vapors within specific temperature ranges that prevent the effluent gases and vapors from reacting, condensing, or depositing and building up solids on inside pipe walls, in valves, and in other pipe components before they can be trapped and removed in a cost effective manner.

In many industrial applications, the acceptable temperature range for the piping is tight or small, i.e., within a few degrees of a set point, and sometimes, the set point temperature is relatively high, e.g., above 180° C. Also, some pipes are fairly long and heat transfer rates may vary in different locations, so individual control of numerous individual pipe heaters positioned along the length of a pipe is needed to prevent development of local hot spots or cold spots. Therefore, there is a significant demand for an accurate and responsive heater control system that allows the user to obtain and maintain temperatures of piping components within user selectable ranges, including capability of controlling individual pipe heaters to deliver different heating power to various pipe locations as needed to maintain a desired temperature profile. Further, because consequences of individual heater failures can be quite expensive due to down time for the manufacturing process to disassemble and clean or replace clogged or damaged pipes, valves, and other components, heater control systems should be able to provide the user with operating information during use, such as whether the heater is "on" or "off" and whether the heater is within a specified temperature range. Pipe heaters often have to be installed on piping components that are small, such as 2-inch or smaller diameter piping, and in places where there is little or no clearance between piping components and adjacent structures. Therefore, users of the heaters often need heaters and associated control equipment that is not bulky or difficult to install, that is durable enough for industrial use, and that is easy to maintain and/or replace. Of course, the heaters and heater control systems must be configured to meet any and all safety standards (e.g., electrical and fire safety standards) that may apply to the particular industry.

One approach that is currently used to provide pipe heater control is to use an individual, self-contained, electro-mechanical temperature controller installed on each heater. With respect to pipeline heaters, these electro-mechanical temperature controllers are typically either bimetallic snap-action or creep-action thermostats, which are generally compact in size and relatively inexpensive. Unfortunately, such temperature controllers that utilize bimetallic or other snap-action or creep-action type thermostats generally have a single, fixed temperature set point and provide only limited temperature control.

In this regard, most snap-action electro-mechanical temperature controllers have a 15° C. or larger hysteresis or deadband around a set point temperature, which is unacceptable for applications that require tight pipe temperature control within only a few degrees of set point. Creep-action thermostats offer tighter initial temperature control, but they then become inaccurate as they drift over time. They also have short service lives due to high levels of electric arcing that occurs between their switch contacts. Also both of these types of electro-mechanical temperature controllers must be configured and installed such that there is intimate thermal contact with the active heater surface of the pipeline heater to function properly. Therefore, the general practice is to permanently embed the electro-mechanical temperature controller within the pipeline heater, and when the thermostat fails or needs servicing, the entire heater with controller must be replaced and typically scrapped. Another problem with most electro-mechanical temperature controllers is that they provide little or no operating information during use, and to find a non-functioning heater, operating or maintenance personnel have to touch each of the heaters with their hands to determine if it is warm and therefore, presumably operating. Additionally, the users of these heaters often are left without any accurate information on the actual operating temperature of the heater.

Another approach to heater control for pipes is the use of electronic temperature controllers that are positioned remote from the heaters and communicate via numerous individual data and power lines with extending from the remote controller to each heater. While such electronic temperature controllers, when combined with thermocouples, provide improved control of each heater and a tighter temperature range, they are relatively costly, and the large bundles of wires are cumbersome to install, especially in tight spaces. The high cost per controller and tangle of wires has led many users to bundle several heaters together in a zone or piping portion and to place the entire zone under the control of a single controller. While that solution decreases the complexity and tangle of wires, it also results in all the pipe heaters in a zone being set to a single temperature and, of course, the accuracy of control decreases with the overall size of the zone. For example, such a zone typically comprises one master and one or more slave heaters. The temperature sensor used by the single electronic controller is located near or connected to the master heater, and the temperature sensed at this single point in the piping system drives the heater control for all the heaters in the zone. However, for a particular required thermal loading, i.e., heating power needed, a temperature profile may be, and often is, different at each of the individual slave heater locations. Also, there is no way to ensure that individual slave heaters in a zone do not run arbitrarily hotter or colder than the master heater, which leads to decreased accuracy or tightness in controlling the temperature throughout the piping system or zone.

The use of a single controller to operate an entire zone may also create safety issues. For example, if the master heater fails cold or low, the controller typically operates or controls the other properly operating heaters in the zone to run hotter and overheat the rest of the piping system. In other words, if the slave heaters are not properly controlled within the zone, and thermal "run away" can result in blown fuses and/or fires, which cause safety hazards and significant down time within the manufacturing facility.

Additionally, the central controllers for systems in which a central controller is wired to control many individual heaters are relatively large, e.g., 48 mm by 96 mm by 100 mm and must be located remote from the heaters due to space and mounting constraints within the typical industrial setting. The size of each central controller becomes more of a problem in practice because a protective cage is often placed around the controller to protect sensitive electronic components from inadvertent damage from high temperature sources and physical contact. Further, installation and maintenance of the remotely-located central controllers for a large number of individual heaters are problematic because of the number of wires that must be run between the central controller and each heater. These wires generally include a power supply line for providing AC power to each heater from the controllers and a temperature sensor line to connect the controller to the thermocouple or other temperature sensing device. For safety and convenience, these wires are often strapped or bundled together, which makes it harder for maintenance personnel to work on a single heater, yet unbundling leaves an even more undesirable tangle of wires. Such "rat's nest" of wiring in the piping system makes maintenance, upgrading, and troubleshooting of these heater control systems time consuming and difficult for operating and maintenance personnel.

Consequently, there remains a need for an improved heater control system for providing enhanced control and monitoring of individual heaters in pipe heating systems, but without the concomitant wiring and controller complexity and physical size that is typically associated with such systems.

SUMMARY OF THE INVENTION

A general object of this invention is to improve individual heater temperature control equipment for pipe heating systems that comprise a plurality of pipe heaters, while minimizing physical size, wiring complexity, and installation, maintenance, and removal inefficiencies.

Another object of this invention is to provide a pipe heater control system that combines the advantages of individual temperature set point adjustment and temperature control in a modular, easily installable and removable structure at each heater with central power, monitoring, and control functionality.

Another related object of the present invention is to provide a heater control system which provides a user with improved heater monitoring and troubleshooting capabilities.

A further object of the present invention to provide a heater control system that is simple, cost-effective, and safe to install and maintain in typical industrial environments that generally impose significant space restraints on the installation of additional equipment.

Additional objects, advantages, and novel features of the invention will be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described therein, a pipe heater control system is provided that generally optimizes temperature setting, controlling, and monitoring functionalities along with power sourcing and distribution among individual satellite heater controllers at each pipe heater and a base controller station remote from the individual heaters in order to minimize individual satellite heater controller size and wiring complexity. Individual temperature set point and temperature controller functionality is allocated to individual local controller modules mounted on individual pipe heaters, where they are most effective, convenient, and efficient, while power sourcing and individual heater temperature monitoring functions are allocated to a remote base unit positioned someplace away from the pipe heaters, where heat generated by power source circuits can be dissipated more readily and where bulky temperature monitoring circuits and hardware can be accommodated more easily. Further, the individual local controller modules are configured for simple "plug in" installation and "pull out" removal at the individual pipe heaters in a manner that is exceptionally convenient, yet preserves temperature sensing accuracy while accommodating daisy chain connection of a plurality of heaters and satellite controller modules to the remote base unit. Each heater has a temperature sensor embedded by a heat insulation coating adjacent the heat producing component of the pipe heater and a socket on the exterior surface of the pipe heater comprising a circuit board with two plug-type electrical connectors for daisy chain connection of power and data cords, plug-type electrical connectors for connecting a local controller module to the heater, and contacts and embedded traces for: (i) routing AC high-voltage power from one daisy chain connector to the other, to the local controller module, and to the heat producing component; (ii) routing dc low-voltage power from one daisy chain connector to the other and to the local controller module; (iii) routing temperature sensor signals from the temperature sensor to the local controller module; and (iv) routing data communication links from one daisy chain connector to the other and to the local controller module. An individual pipe heater can be connected to the base unit by simply plugging a daisy chain cord from another pipe heater into the socket, and a local controller module can be connected to the pipe heater and to the base unit by simply plugging the local controller module into the socket. If a particular pipe heater is the first in a daisy chain line of pipe heaters, it and its local controller module can be connected to the base unit by simply plugging an extension cord from the base unit into the receptacle. Each daisy chain cord and the extension cord has wire conductors for: (i) AC high-voltage power; (ii) dc low-voltage power; and (iii) data communications links.

As an alternative, each local controller module can be equipped with its own individual dc low-voltage power supply powered by the high-voltage AC power, which would eliminate the need for wire conductors in the daisy chain cord and in the extension cord. However, currently available circuits that convert high-voltage AC to low-voltage dc power for use in electronic circuits produce significant amounts of heat that has to be dissipated to prevent damage to electric circuit components. Dissipation of such heat next to a pipe heater that is also producing large quantities of heat is not efficient and requires bulky heat sink material with fins or some other heat dissipation device. Therefore, while it may be desirable to provide a dc low-voltage power supply as a part of each local controller module, having to also add heat dissipation equipment would make the local controller module larger, heavier, and more unwieldy. On balance, with current dc power supply circuits, it is deemed preferable to add the low voltage dc power conductors to the daisy chain cord and extension cord and to place the dc power supply in the base unit.

As another alternative, a central processing station can be connected to one or more base units to monitor the pipe heaters in one or more daisy chains at a supervisory central location and to send control signals through the base stations to individual local controller modules.

According to one aspect of the local invention, the controller modules are designed to integrate accurate electronic temperature sensing with power delivery control. In this regard, a preferred embodiment of the invention includes electronic components and circuitry to provide either on/off control or proportional-integrated-derivative (PID) temperature control to effectively control by electronic switching the operation of a heat-producing element or component of the pipe heater. The components generally include a temperature sensor, such as a thermistor, positioned adjacent the heat-producing element or component for sensing temperature and a zero voltage switch with a triac for controlling heater operations quickly without arcing based on the sensed temperature. This electronic temperature sensing and control allows the temperature to be maintained within 4 to 5° C. or even more tightly about a temperature set point.

According to another aspect of the invention, the local controller modules are adapted for individual set point temperature adjustment either manually at each local controller module or remotely via data connection from a supervisory central monitor via the base station and data communication links. This feature allows user-selectable, and, if desired, differing temperature settings along the length of a piping system, which may be useful for numerous process applications and overcomes the problem with prior art devices which used a single, remotely-located controller for numerous heaters connected together in a zone (i.e., that provided the same temperature set point for all heaters connected to the remotely-located controller).

Preferably, each of the local controller modules include visual display devices, such as color LED's, for indicating the operating status of the pipe heater on which it is mounted. In one embodiment, three LEDs are used to show an "in-temperature-range" status, an "under-temperature-range" status, and an "over-temperature-range" status. Alternatively, or in addition, monitoring of the local controller modules and pipe heaters can be accomplished remotely by including an LED or other display at the base station to indicate, for example, when a daisy chain line has a pipe heater that is under temperature range, when all the pipe heaters in a daisy chain line are within set temperature ranges, and when a daisy chain line has a pipe heater that is over temperature range. More sophisticated remote monitoring can be provided in another embodiment that includes a supervisory central monitoring station, which has a user interface and a monitor that can be used to display operational data of all of the pipe heaters controlled by the heater control system. In addition to visual display of status indicators, audio alarms are included in some systems to quickly alert operating personnel to "out-of-temperature-range" occurrences.

Other features and advantages of the invention will become clear from the following detailed description and drawings of particular embodiments of the heater control systems and associated combinations and methods of operating the heater control systems steps of the present invention.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings.

DETAILED DESCRIPTION OF THE INVENTION

Figure 1:
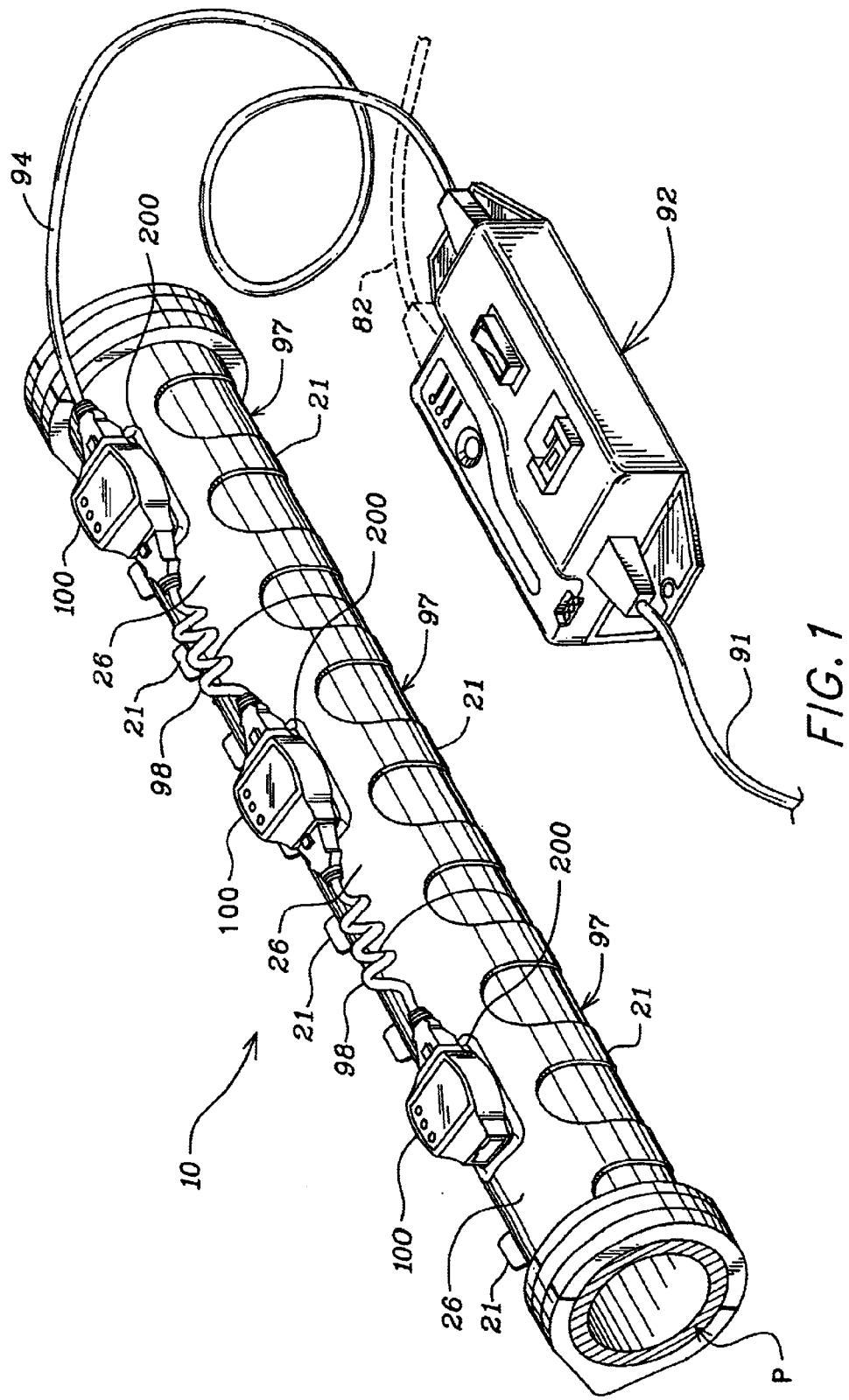
FIG. 1 is an isometric view of the pipe heater control system components of this invention mounted on a typical pipe section, including an example of three local control modules mounted on pipe heaters in a daisy chain connection to a base unit.
Figure 2:
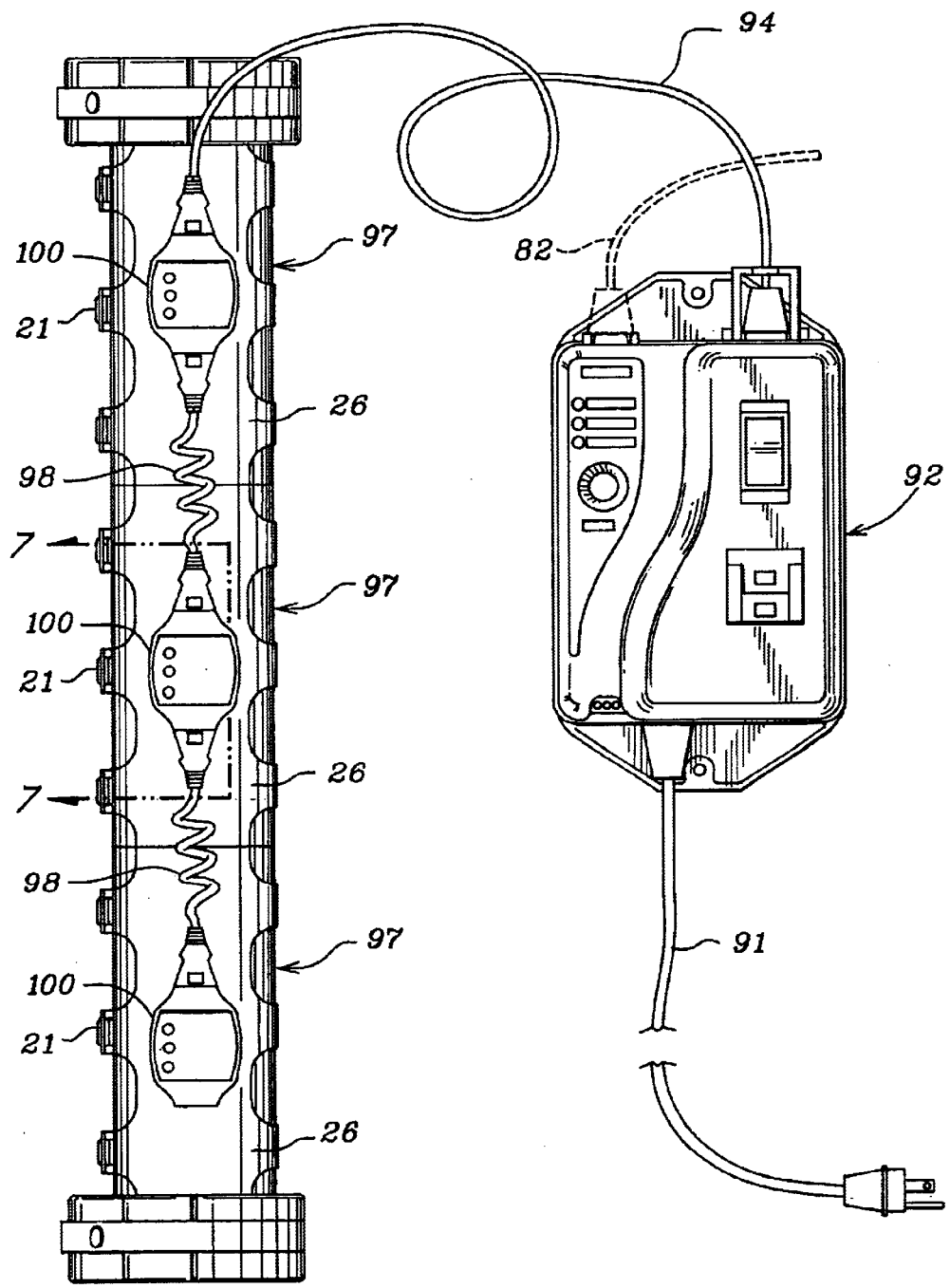
FIG. 2 is a front elevation view of the example three local controller modules and base unit shown in FIG. 1.

A pipe heater control system 10 according to this invention is shown in FIGS. 1 and 2 with an example of three of the local controller units 100 of this invention mounted on three pipe heaters 97 in a daisy chain connection to a base unit 92. The three pipe heaters 97 are mounted on a pipe P to be heated in a typical manner, for example, as described in U.S. Pat. No. 5,714,738 issued to Hauschulz et al., which describes the structures, materials, and uses of such pipe heaters and is incorporated herein by reference for all that it discloses. While some of the pipe heater 97 structural details will be described below, suffice it to say at this point that each pipe heater 97 can be secured on the pipe P by one or more straps 21. The pipe heaters 97 and local controller modules 100 are connected together in daisy chain fashion by daisy chain cords 98, which will be described in more detail below. The first pipe heater 97 and local controller module 100 in the daisy chain are connected to the base unit 92 by an extension cord 94.

Figure 3:
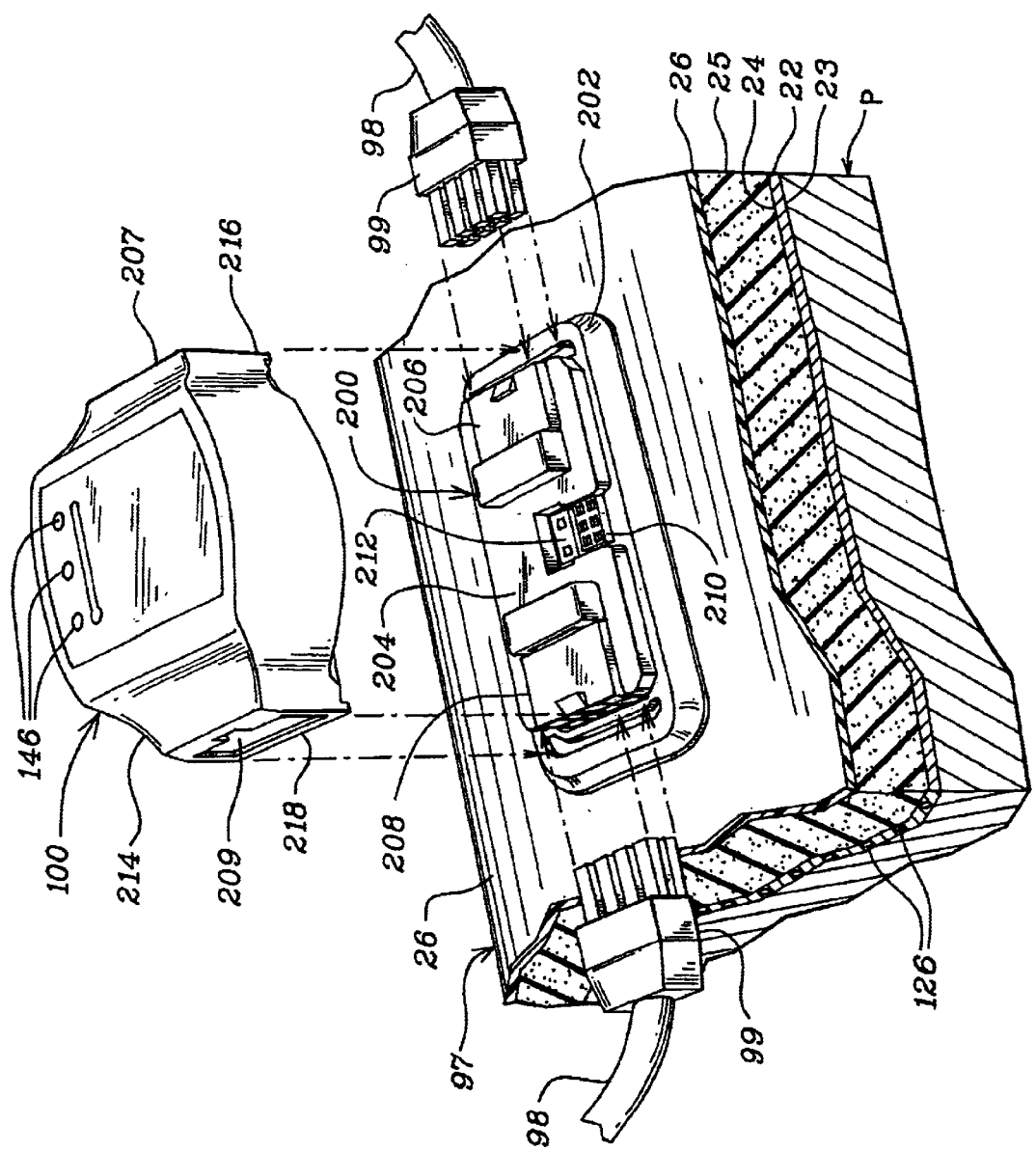
FIG. 3 is an isometric view of the socket of this invention on a pipe heater surface with a local controller module of this invention poised over the socket in position to be lowered onto and plugged onto the socket.

Essentially, as shown in FIG. 3, a typical pipe heater 97 comprises a heating mat or core component 22 with an inside surface 23 that is adapted to interface with the pipe P, a thermal insulation layer 25 bonded to the outside surface 24 of the heating component 22, and a jacket or partial jacket 26 from which the straps 21 extend. In the pipe heater 97 shown in FIGS. 1–3, and as best seen in FIG. 3, a set of resistive heater wires or heater elements 126 are embedded in the heating mat or core component 22 and are powered by high-voltage alternating current (AC) electric power, typically 120 volts or 240 volts, 50 or 60 hertz, to produce heat, although other voltages and/or hertz power and other kinds of heat producing components can be used.

Figure 7:
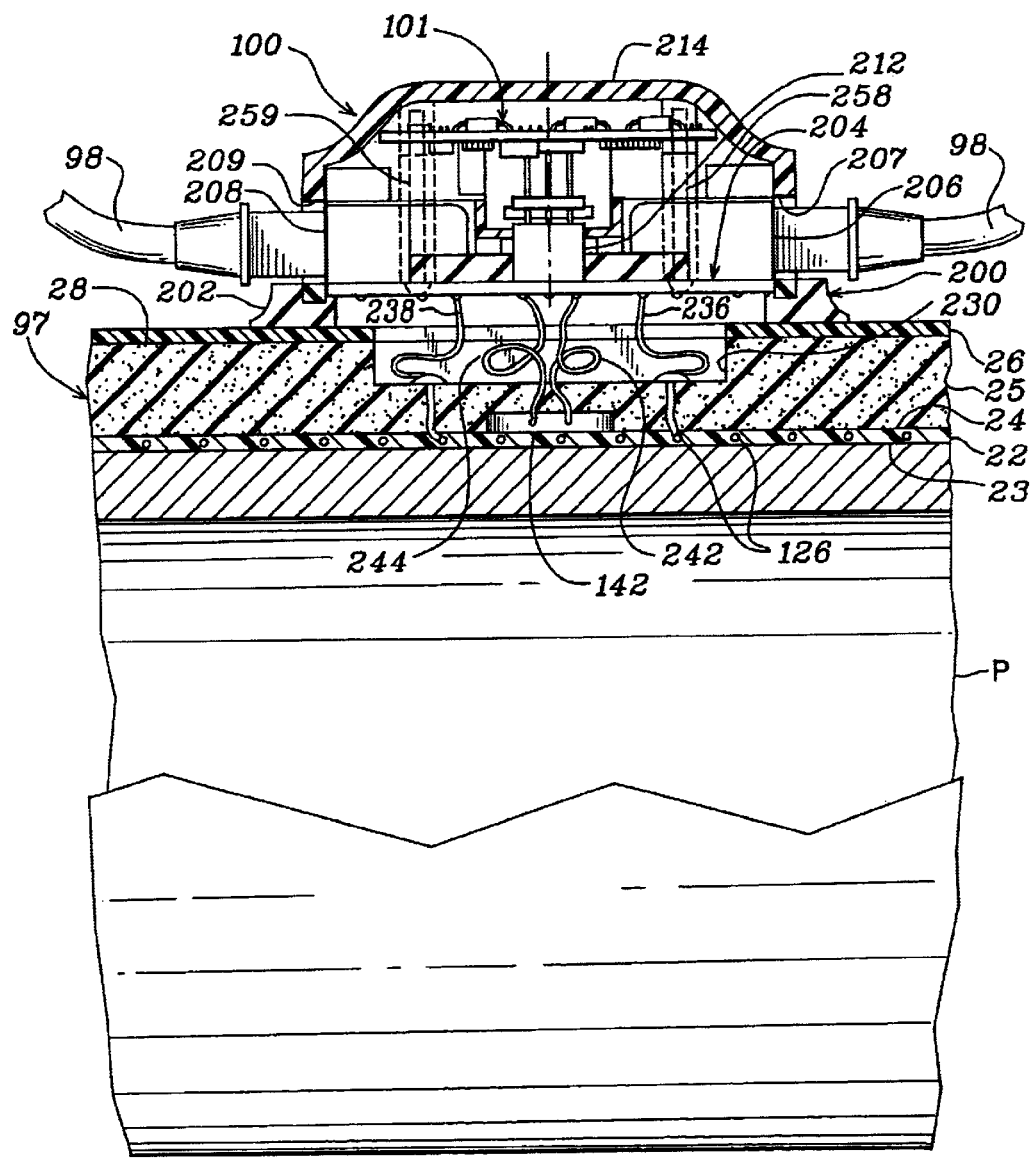
FIG. 7 is an enlarged cross-section view of a local controller module of this invention taken substantially along section line 7—7 of FIG. 2.

In this invention, the local controller module 100 on each pipe heater 97 controls the high-voltage AC electric power to the resistive heater wires 126 based on a set point temperature, as will be explained in more detail below. Suffice it to say at this point that the high-voltage AC power is delivered to the pipe heaters 97 by the extension cord 94 from the base unit 92 (FIGS. 1 and 2) and by the daisy chain cords 98 (FIGS. 1–3). A temperature sensor 142, as best seen in FIG. 7, can be embedded in the thermal insulation 25, preferably on the surface 24 of the heating component 22, so that it is not buffered from heat or temperature of the heating component 22 by any insulation 25 between it and the heating component 22. An electric circuit, such as the local controller process circuit 101, in the local controller module 100 compares a signal from the temperature sensor 142 with a set point temperature and, if the signal from the temperature sensor 142 indicates the temperature of the heating component 22 is less than the set point temperature or less than a certain range from the set point temperature, then the electric circuit 101 will turn "on" the high-voltage AC electric power to the heater element 126 to produce more heat. On the other hand, if the signal from the temperature sensor 142 indicates that the temperature of the heating component 22 is higher than the set point temperature or higher than a certain range from the set point temperature, then the electric circuit 101 will turn "off" the high voltage electric power to the heater element 126. The local controller process circuit 101 may include a microprocessor 134 (FIG. 10) to accomplish these and other functions, as explained below.

In the preferred embodiment, the electric local controller process circuit 101 in the local controller module 100 is powered by low voltage DC current, e.g., 9 volts, which is produced by a dc power supply in the base unit 92 (FIGS. 1 and 2) and delivered to the local controller modules 100 by the extension cord 94 and daisy chain cords 98. The dc power supply produces the low-voltage dc power from the high-voltage AC power obtained by the base unit 92 from public utility or other AC power source available in the vicinity and delivered to the base unit 92 by a conventional power cord 91. It is preferred to place the dc power supply in the base unit 92 rather than in individual local controller modules 100, even though this arrangement requires more wires in the extension cord 94 and daisy chain cords 98, for several reasons. First, dc power supplies that produce low-voltage dc current from high-voltage AC electric current consume substantial amounts of power that is manifested in creation of substantial amounts of heat, which must be dissipated to avoid high temperatures that could damage electric circuit components. Enough heat can be dissipated naturally in ambient atmospheric or room temperature environments, where the base unit 92 is usually situated, to avoid such damage to circuit components. Therefore, no bulky heat dissipation devices are needed for such dc power supplies in the base unit 92. On the other hand, the local controller modules 100 are positioned on the pipe heaters 97, which are hot themselves. Therefore, it would be much more difficult to dissipate heat from a dc power supply located in the local controller module 100 and would require at least bulky heat sink material with fins or other devices to dissipate heat produced by a dc power supply. Second, providing a dc power supply at each local controller module 100, instead of at the base unit 92 only, would multiply power consumed by the heater control system 10. Therefore, in the interest of optimizing size, power consumption, and other considerations, it is preferred to allocate the dc power-production function for the local controller modules 100 to the base unit 92.

On the other hand, locating the heater control functions of comparing temperature sensor 142 signals with set point temperatures and switching the high-voltage AC power "on" and "off" at the local controller modules 100 is preferable over providing those functions in the base unit 92 or elsewhere. For example, this allocation of functions allows independent temperature control of each pipe heater 97 with minimal circuitry 101 without the need for dedicated AC power and data communication wires from the base unit to each individual pipe heater 97, which would inhibit the simple daisy chain connectability of the local controller modules 100 to the base unit 92 according to this invention.

It is feasible with this configuration, though, to include several, preferably two, data communications wires in the extension cord 94 and daisy chain cords 98 for some useful data that can be bussed between the local controller modules 100 and the base station 92, such as data that would indicate whether all of the daisy chained heaters 97 are operating within their respective set point temperature ranges or at least one of them is outside (above or below) its set point temperature range so that such information can be displayed at the base unit 92. It is also feasible to bus individual set point temperature instructions to respective local controller modules 100 in the daisy chain via the two communications links in the extension cord 94 and daisy chain cords 98, as will be discussed in more detail below. Specific data for a particular local controller module 100 can be encoded with an identification that is accepted only by that particular local controller module 100. Such encoded addressing to electronic devices is known and understood by persons skilled in the art.

A significant feature of this invention is the combination modular and daisy chained connectivity of the pipe heaters 97 and local controller modules 100 to the base unit 92 via socket 200 in the pipe heaters 97, as best seen in FIGS.1–7. Referring first primarily to FIG. 3, the socket 200 has a socket frame 202 that is either molded as an integral part of the jacket 26 or bonded to the jacket 26 and a socket circuit board 204 that is mounted in the socket frame 202. The socket circuit board 204 enables the combination modular and daisy chained connectivity of this invention by serving a number of functions, including: (i) routing the high-voltage AC electric power from one daisy chain connector 206 to the other daisy chain connector 208, both of which are integral parts of the socket circuit board 200; (ii) routing high-voltage AC power to the local controller module 100 for switching "on" and "off"; (iii) routing switched Aon@ high-voltage AC power from the local controller module 100 to the heater element 126; (iv) routing low-voltage dc power from one daisy chain connector 206 to the other daisy chain connector 208; (v) routing low-voltage dc power to the local controller process circuit 101 (FIG. 7) to the local controller module 100; (vi) routing temperature sensor signals from the temperature sensor 142 (FIG. 7) to the local controller module 100; (vii) routing data communication links from one daisy chain connector 206 to the other daisy chain connector 208; (viii) routing data communication links to the local controller module 100; (ix) providing high-voltage AC connector 212 and low voltage dc connector 210 for "plug-in" type mounting of the local controller module 100 to the pipe heater 97; and (x) providing daisy chain connectors 206, 208 for "plug-in" connection of the daisy chain cords 98 or the extension cord 94 to the pipe heater 97.

Figure 4:
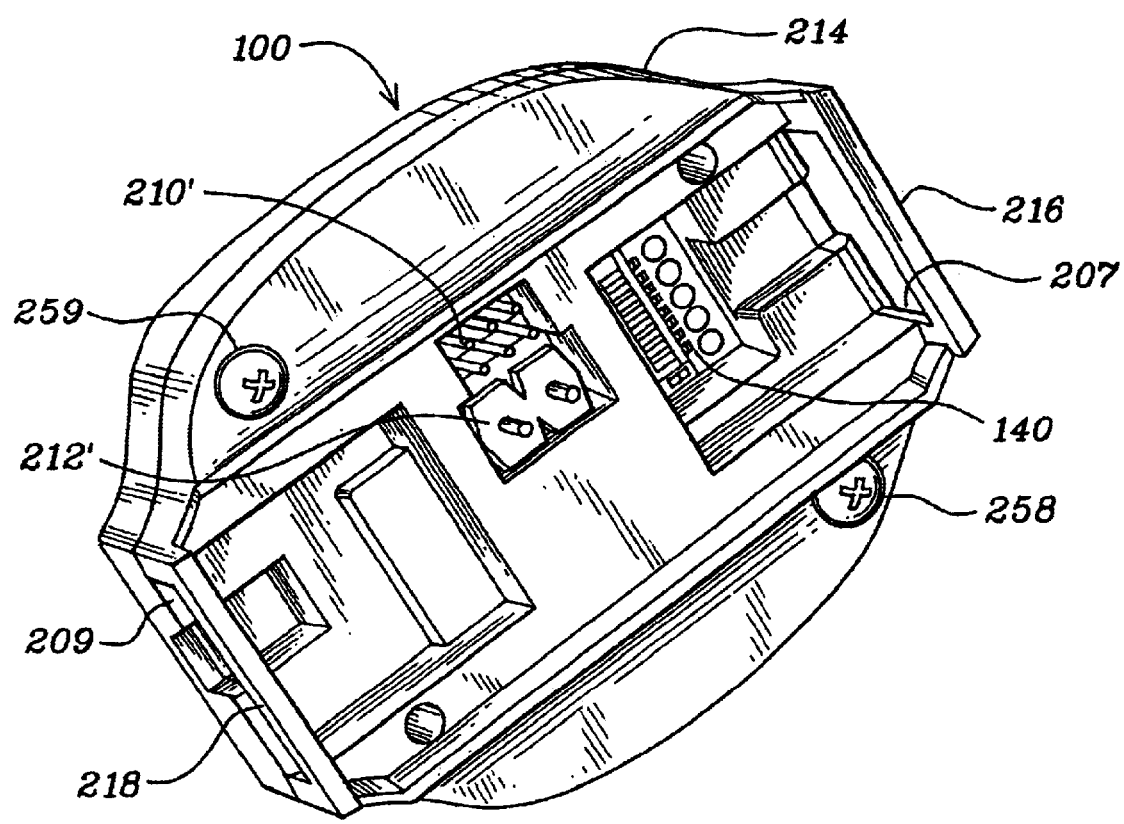
FIG. 4 is an isometric view of the bottom of the local controller module.
Figure 5:
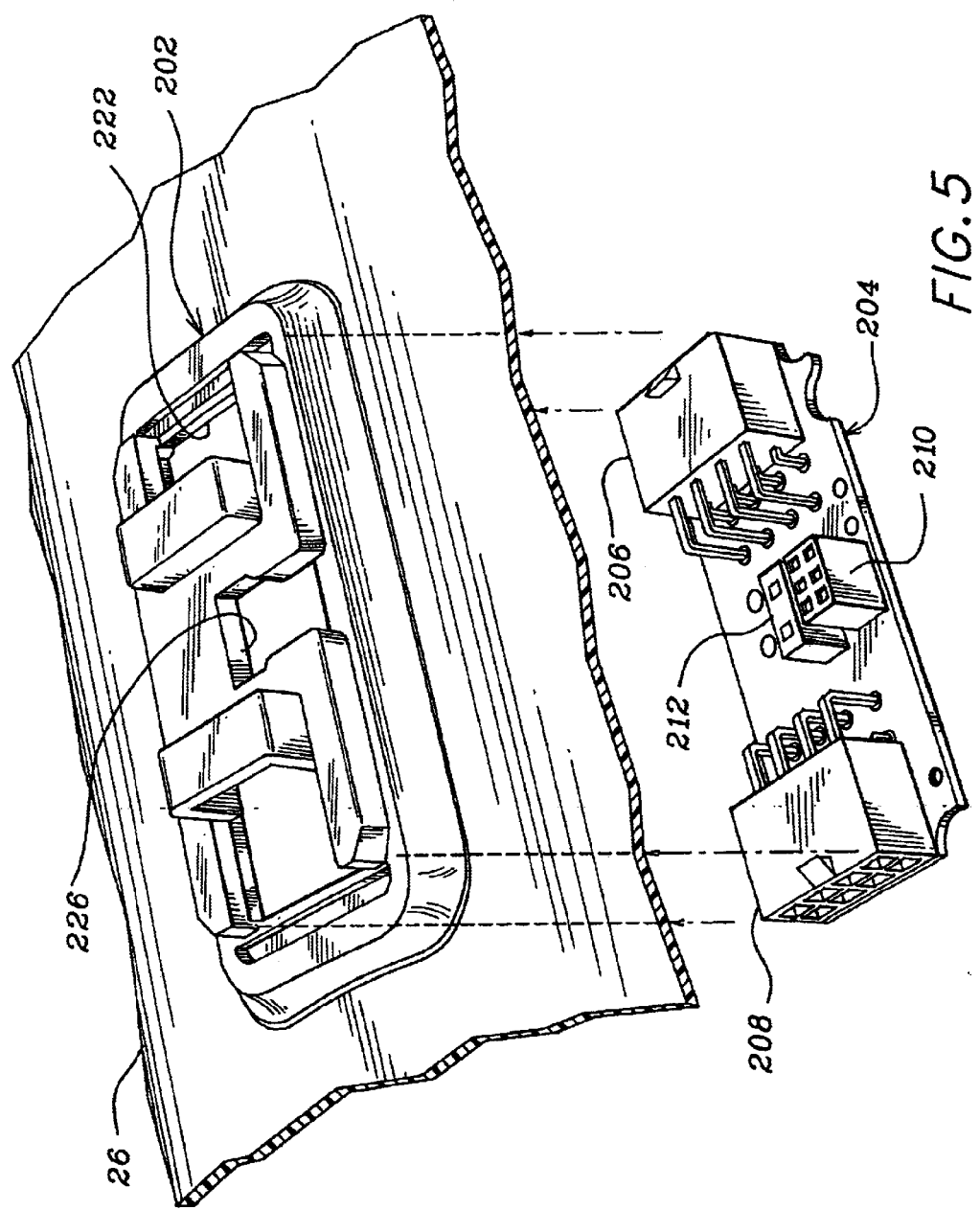
FIG. 5 is an isometric view of the tops of the socket circuit board and socket housing with the socket circuit board poised in position to be assembled into the socket housing.

The bottom of the local controller module 100 is shown in FIG. 4, when viewed in combination with the top of the socket circuit board 204, illustrates the male parts 210', 212' of connectors 210, 212, respectively, which plug into the corresponding female parts of those connectors 210, 212 to facilitate the "plug-in" mounting or docking of the local controller module 100 on the socket 200 of pipe heater 97. All of high-voltage AC, low-voltage dc, temperature sensor signals, and data links to and from the local controller module 100, are established by merely docking or plugging the local controller module 100 into the socket 200. Then, when the daisy chain cords 98 are plugged into the sockets 206, 208 through the openings 297, 209 in the housing 214 of the local controller module 100, the retainer bars 216, 218 interact with the plug ends 99 of daisy chain cords 98 to help retain the local controller module 100 on the socket 200. The local controller module 100 can be removed from the pipe heater 97 by unplugging daisy chain cords 98 from connectors 206, 208 and unplugging the local control module 100 from plug connectors 210, 212 by simply pulling the local controller module 100 away from the socket 200.

Figure 6:
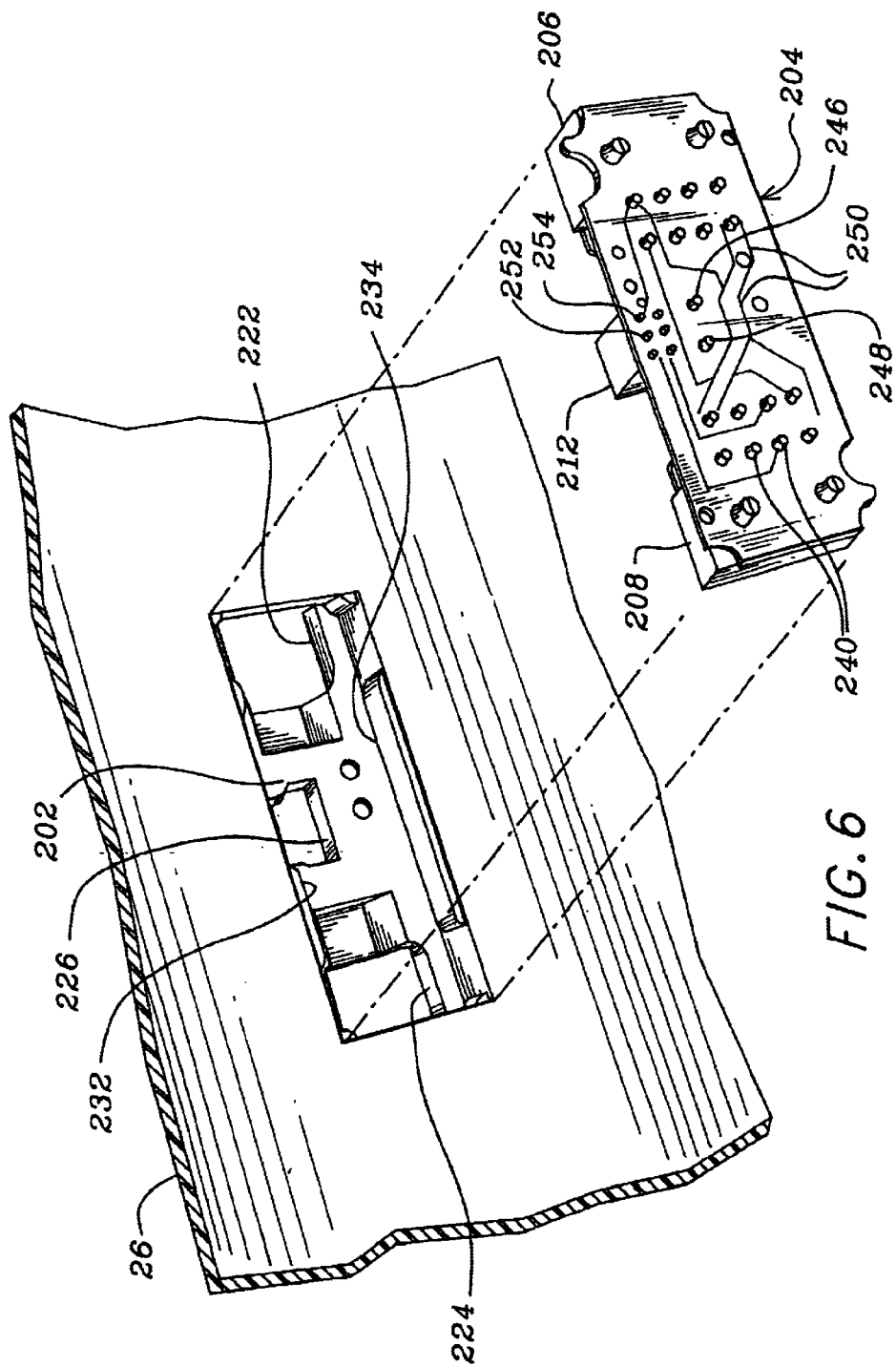
FIG. 6 is an isometric view of the bottoms of the socket housing and socket circuit board poised in position to be assembled together.

The mounting of the socket circuit board 204 in the socket frame 202 is illustrated in FIG. 6, where the socket circuit board 204 is poised for insertion into the bottom of the socket frame 202. Apertures 222, 224, 226 in the top of socket frame 202 accommodate insertion of connecters 206, 208, 210, 212 through the socket frame 202. The socket frame 202 is preferably slightly elastic, so it can be deformed enough to insert the edges of the socket circuit board 204 over the ledges 232, 234 to retain the socket circuit board 202 in the socket frame 202. Either prior to or after such insertion, the high-voltage AC wire leads 236, 238 to the heater element 126 and the wire leads 242, 244 from the temperature sensor 142 are soldered to appropriate posts 246, 248 and 252, 254, as best seen in FIG. 7. A plurality of other posts 240 and traces 250 illustrated diagrammatically in FIG. 6 provide the routing functions of the socket circuit board 204, as explained above. There is enough room in cavity 230 into which the wire leads 236, 238, 242, 244 can be folded as the jacket 26 and socket 200 are lowered and bonded onto the exterior surface 28 of the thermal insulation 25 of the pipe heater 97 to position the socket 200 over the cavity 230.

In the local controller module 100, the control circuit 101, which will be provided in more detail below, is positioned primarily on a controller circuit board 256. The controller circuit board 256 is mounted in the housing 214, and the top and bottom parts of the housing 214 with the circuit board 256 are held together by a pair of screws 258, 259.

Figure 8:
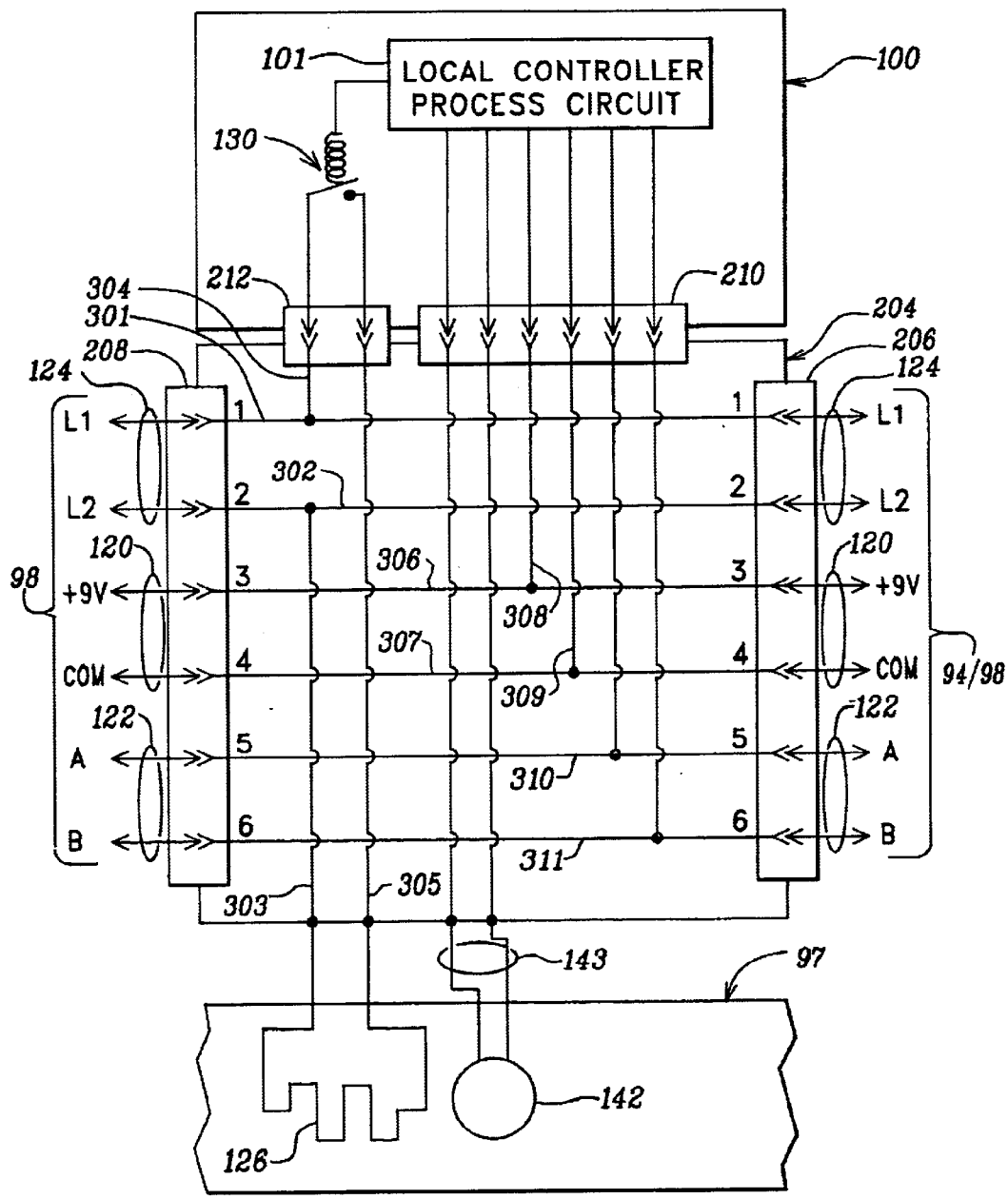
FIG. 8 is a schematic diagram of the socket circuit board routing of power and signals between daisy chained inputs and outputs and to and from other pipe heater and local controller module components.

As illustrated schematically in FIG. 8, the preferred embodiment heater control system 10 of this invention has six wire conductors in the extension cord 94 and in each daisy chain cord 98, and all six of them trace straight through the socket circuit board 204 from connector 206 to connector 208 to accommodate the daisy chain connection of one set of pipe heater 97 and local controller module 100 to another. Two wires 124, L1 and L2, carry the high-voltage AC current for powering the heater elements 126. One of the traces L1, L2 is tapped to the heater element 126 and the other passes via connector 212 to some type of power switch 130 in the local controller module 100, as will be described in more detail below, before returning back through connector 212 and socket circuit board 204 to the heater element 126. The low voltage (e.g., +9 volts) dc power is carried on two wires 120 (+9 volt and common), both of which are also traced straight through the socket circuit board 204 from connector 206 to connector 208. Both the +9 volt and common (COM) traces are tapped into the local controller module 100 via connector 210 to power the local controller process circuit 101. Finally, two data wires 122, A and B, are also traced straight through the socket circuit board 204 from connector 206 to connector 208, and both are tapped through connector 210 for passing data into and out of the local controller process circuit 101, as will be explained in more detail below. Thus, it is clear from FIG. 8 that each pipe heater 97 and local controller module 100 operate off all of the wires 124, 120, 122 (L1, L2, +9V, COM, A, and B) in electrical parallel connection to other pipe heaters and local controller modules 100 in a daisy chain according to this invention. The two wires 143 are purely local and not included in the extension cord 94 or daisy chain cords 98, but they trace through the socket circuit board 204 from the temperature sensor 142 to the local controller process circuit 101 via the connector 210 for the purposes described above.

Figure 9:
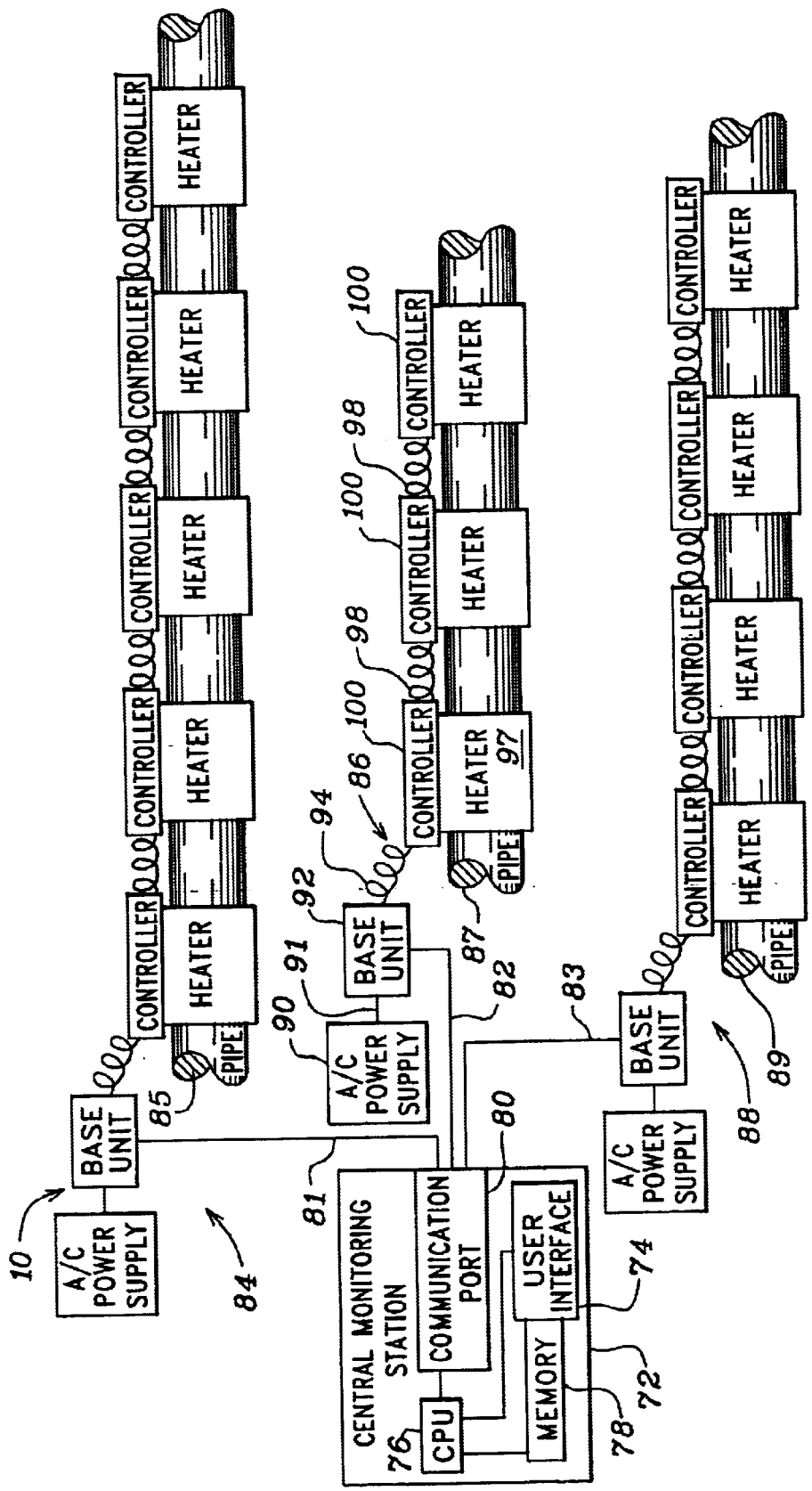
FIG. 9 is a functional block diagram of the pipe heater control system of the present invention including a monitoring station in communication with three pipeline heater systems having base units and local heater controller modules.

The preferred heater control system 10 is illustrated diagrammatically in FIG. 9 and generally includes an optional central monitoring station 72 with a user interface 74 (i.e., a monitor, with or without a touch screen capability, a keyboard(s), a mouse, and other peripheral computer interface equipment), a central processing unit (CPU) 76 in communication with the user interface 74 and memory 78 which may contain software for use in monitoring and controlling heaters and heater controllers, databases with temperature "recipes" for various processes and other temperature and maintenance information, and a communication port 80 for receiving and transmitting digital data. The central monitoring station 72 is connected with communication lines 81, 82, and 83 to, for example, three pipe heater control systems 84, 86, and 88, on pipes 85, 87, and 89, respectively. During operation, the central monitoring station 72 allows a user at a remote location to quickly monitor the temperature of each heater in the heater control systems 84, 86, and 88 and in some embodiments, to transmit commands via the communication lines 81, 82, and 83 to change the temperature settings of the individual heaters or otherwise control operation (e.g., turn the heaters on and off). In this fashion, a single central monitoring station 72 can be used to control and monitor a very large number of heaters and heater systems (although only three are shown for ease of illustration). To more fully understand the operation and use of the central monitoring station 72, its integration with a single pipe heater control system 86 will be discussed in detail in connection with the description of the components of the control system 86. Of course, it will be understood from the following discussion that the control system 86 may be utilized separate from the heater control system 10.

It is preferred that the pipe heater control system 86 provide control and supply power to a number of controllers and heaters with the use of a minimum number of leads, wires, and/or lines to avoid the rat's nest problem that is prevalent with prior art control systems. In this regard with reference to FIGS. 9 and 10, the pipe heater control system 86 includes the base unit 92 that communicates with the central monitoring station 72 via communication line 82 and receives AC power from a single AC power supply 90 over line 91. The base unit 92 includes a digital input and output device 116 for communication with the central monitoring station 72 and a digital I/O 112 for transmitting commands and information requests from the central monitoring station 72 and the base station 92 to satellite (local) controllers 96, 100, 104 and for receiving digital signals from the same local controllers 96, 100, 104. In a preferred embodiment, both of these communication interfaces are configured to use both the EIA RS-232 and RS-485 standards at a fixed baud rate of 9600 baud. The base unit 92 includes an optional ground fault interrupt 106 and a 12-amp circuit breaker 108 for increasing the operating safety of the control system 86 and for isolating the local controller modules 100 from the AC power supply 90 in the event of a short circuit or ground fault condition. Additionally, the base station 92 includes a DC power supply 110 (e.g., a 9-volt DC power supply) for supplying DC power for electronic temperature control components of each local controller module 100.

In the preferred embodiment base unit 92 illustrated schematically in FIG. 9, the AC power output, DC power output, and digital I/O lines are integrated and/or contained within a single communication/power extension cord 94 that is passed to the first local control module 100. Further, the communication/power extension cord 94 and daisy chain cords 98 are illustrated as coiled in FIG. 9, because such coiling further enhances ease of installation and maintenance at the specific location of each local controller module 100, and the distance between the same may vary with each application. With the combination of a coiled cord 94 (as well as daisy chain cords 98) and integration of power and communication lines into a single cord 94 (and daisy chain cords 98), the control system 86 is able to readily achieve the goals of minimizing the complexity of the system, reducing space requirements, and increasing the ease of installation and replacement (i.e., each line 94, 98 and local controller modules 100 can be individually plugged into the system 86).

To allow a single line to be fed from the base unit 92, it is important that power and communication lines be passed through each local controller module 100 to allow the local controller modules 100 to be daisy chained together. This integration of power and temperature sensing and control at each local controller module 100 is achieved as illustrated in the functional block diagram of FIG. 10.

Significantly, this integration of control functions allows each of the local controller modules 100 to be housed in a single housing 148 as illustrated in FIGS. 1–7. Additionally, the size of the housing 148 is maintained relatively small (i.e., a width, W, of less than about 64 mm, a height, H, of less that about 32 mm, and a length, L, of less than about 70 mm). The local controller module 100 and housing 148 are configured, in this exemplary embodiment, for mating with a docking port or socket 200 attached to a wrap around flexible pipe heater 97 as described above.

Figure 10:
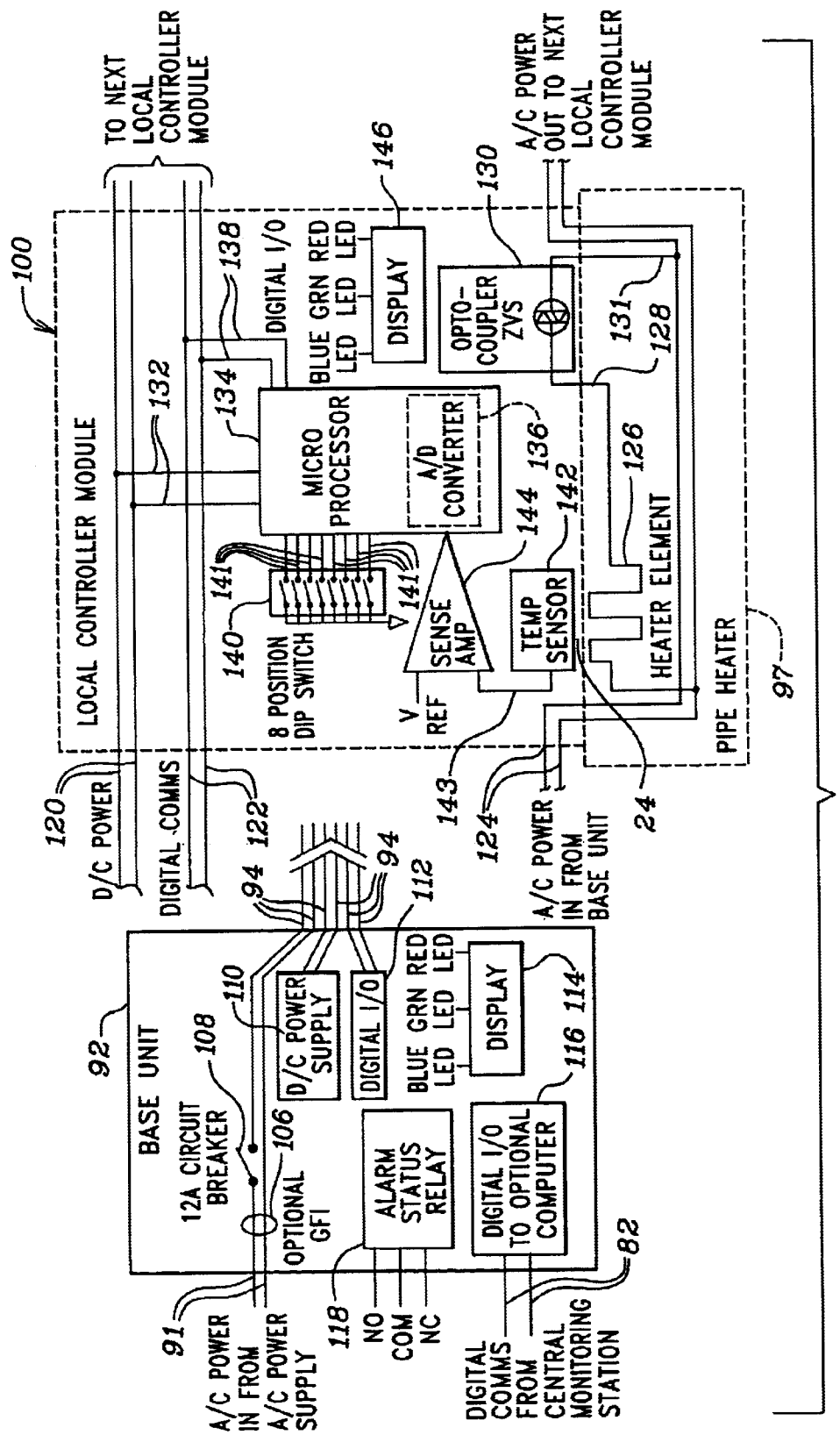
FIG. 10 is a functional electrical block diagram of one of the base units and local controller modules and interconnected pipe heaters of FIG. 9.

Referring again to FIG. 10, the local controller module 100 is configured to receive AC power from the base unit 92 via cord 94 on leads 124 which are directed into the heater 97. It should be noted that FIG. 10 is schematic, so the exact locations of lines e.g., line 120, 122, 124 etc. are not shown in FIG. 10. See FIG. 8 and related description for the preferred location of those lines or wires 120, 122, 124 in the socket circuit board 204, as explained above. The heater 97 includes heater element 126 that operates on the AC power on leads 124 and is electronically controlled (i.e., turned on and off) via leads 128 and 131 by opto-coupler zero voltage power switch 130 (although other electronic switching devices may readily be utilized). The local controller module 100 brings DC power in with leads 120 which power the microprocessor 134 and other electronic components via leads 132. The microprocessor 134 is included in the local controller module 100 to provide better control over the temperature settings of the heater 97, to operate operational displays 146 at the controller 100, to operate the power switch 130 to maintain temperatures within a desired and user adjustable range, and to provide digital communication capability with the base station 92 and in some cases, the monitoring station 72.

During operation, the temperature sensor 142 (e.g., a thermistor, thermocouple, or the like) which is positioned adjacent the heater surface 24 responds to temperature changes in the heater surface 24 and outputs on lead 143 a representative signal (such as a voltage signal). Sense amplifier 144 amplifies this signal and transmits an analog signal to the microprocessor 134 which includes an analog to digital converter 136. The microprocessor 134 is configured to process the digital signal from sense amplifier 144 to determine the temperature of the heater surface 24. The microprocessor 134 then determines if the heater surface 24 temperature is within an acceptable range about a temperature set point.

According to the invention, the controller 100 is preferably adapted to allow a user to control (i.e., set and later adjust) the temperature at which the heater 97 is operated. Typically, this is achieved by setting a temperature set point and, in some embodiments, a range of variation about this set point (or the temperature band about the temperature set point may be fixed by the electronic temperature control technique utilized, e.g., if on-off control is used with turning on a heater at a low temperature setting and turning the heater off at a high temperature setting). As illustrated in FIG. 4, the controller 100 includes an 8-position dip switch 140 which allows the user to either manually set the temperature set point (e.g., by setting the binary number of a desired temperature in the 8 position dip switch 140) or remotely by setting all the switches of the dip switch 140 to zero or other designated remote mode settings and then remotely communicating a temperature set point to the microprocessor 134 via digital communication lines 122 from the monitoring station 72 (which is stored in memory of the microprocessor 134). As illustrated, the dip switch 140 is accessed by unplugging the local controller module 100 from the docking port or socket 200 of the heater 97.

During operations, the microprocessor 134 compares the temperature determined from signals from the temperature sensor 142 with the temperature setting of the 8 position dip switch 140 via lines 141 or the temperature received from the monitoring station 72 to verify whether the heater surface 24 is within an acceptable temperature range (such as, for example, within 5° C. and more preferably within about 2° C. of the temperature set point). If the heater surface 24 temperature is under the acceptable temperature range, the microprocessor 134 functions to operate the switch 130 to operate the heater 97 and to communicate this temperature status to the base station 92 over leads 138 and 122.

Referring to FIG. 10, the base unit 92 may have its own operation status display 114 and/or an alarm status relay 118 for activating audio and visual alarms either at the base station 92 or at a remote location (e.g., a flashing light that is readily visible from a distance). In a preferred embodiment, the operation status display 114 "lights" a blue LED when at least one of the pipe heaters 97 is under its set temperature range, lights a green LED when all of the pipe heaters 97 are within their set temperature ranges, and lights a red LED when one of the pipe heaters 97 is above its set temperature range. The base unit 92 concurrently transmits the temperature and operating information for each pipe heater 97 to the monitoring station 72 where it can be displayed on the user interface 74 and/or stored in memory 78.

Referring again to FIG. 10, the microprocessor 134 also functions to operate a local display 146 with three colored LEDs similar to that discussed for the base unit 92 that enables a user to quickly, visually monitor each of the pipe heaters 97 in a pipe line. The LED display 146 is readily visible on the upper, exterior portion of the controller housing 148 (see FIG. 3). The microprocessor 134 continues to monitor and compare the heater surface 24 temperature, and, once the temperature reaches a predetermined point within the temperature range, the microprocessor 134 functions to operate the switch 130 to turn off the heater 97, communicate "within range" information to the base unit 92 (and thereby, the monitoring station), and operate the display 146 of the local controller module 100. The microprocessor 134 then continues to monitor the temperature of the heater surface 24 to communicate if the temperature is over or out of an acceptable range and to repeat the above operations when the temperature falls under the preset temperature range. The control logic exercised by the microprocessor 134 can be a simple on/off control, a version of PID control, and other control functions.

In the above manner, the temperature of each pipe heater 97 can be set and maintained within a relatively tight temperature range (such as a 1 to 2° C. range). Significantly, the use of a monitoring station 72 and remotely programmable local controller modules 100 allows a user to establish and rapidly change the temperatures of each of the pipe heaters 97 to establish relatively complex recipes for changing processes. Further, the configuration of the heater control system 10 allows a user to remotely and locally monitor the operation of each local controller module 100 and pipe heater 97 to enhance process monitoring and to decrease the time spent on troubleshooting. To further maintenance, each of the local controller modules 100 is designed to allow a user to unplug a single controller 100 and/or its associated power/communication cords 94, 98 and plug in replacements.

During operation, the base unit 92 operates to at least periodically, such as once every 2 seconds or some other fixed time period, poll the connected local controller modules 100 for status (e.g., temperature) and diagnostic information. To monitor the life of certain components of the local controller module 100, a counter mechanism or routine may be included within the microprocessor 134 to track the times they are operated. For example, electro-mechanical relays typically have a fixed operating life and it may be useful to include a counter for each included electro-mechanical relay to count the times they are activated. Once the preset number is reached, the microprocessor 134 sends this information to the base unit 92 to establish a maintenance flag for the local controller module 100.

Since numerous modifications and combinations of the above method and embodiments will readily occur to those skilled in the art, it is not desired to limit the invention to the exact construction and processes shown and described above. For example, in FIG. 9, a separate AC power supply and base station was shown for each pipe line and this configuration was selected to easily comply with certain electrical safety standards. Of course, the illustrated heater control system 10 can be modified to include a single AC power source and a single base station that together provide AC power to multiple control systems 84, 86, and 88. Also, in lieu of separate data communications lines or wires 122, data could be sent in other ways know to persons skilled in data transfer arts, for example, infrared transmitters or receivers, fiber optics, or radio frequency (RF) communications over the AC power lines 124, and the like. Accordingly, resort may be made to all suitable modifications and equivalents that fall within the scope of the invention as defined by the claims which follow. The words "comprise," "comprises," "comprising," "include(s)," and "including" when used in this specification and in the following claims are intended to specify the presence of stated features or steps, but they do not preclude the presence or addition of one or more other features, steps, or groups thereof.

What is claimed is:

1. In pipe heater apparatus comprising a plurality of pipe heaters configured for mounting on one or more pipes, wherein each of said pipe heaters has a heat producing element that is capable of producing heat from electric power derived from line voltage electricity and a power controlling circuit for controlling the electric power to the heat producing element, the improvement comprising:

a socket on each of said pipe heaters comprising: (i) an inlet daisy chain connector, (ii) an outlet daisy chain connector; (iii) a modular receptacle connector, (iv) a first electric power trace extending between the inlet daisy chain connector and the outlet daisy chain connector and connected electrically to the heat producing element; (v) a second electric power trace extending between the inlet daisy chain connector and the outlet daisy chain connector and connected electrically to the modular receptacle connector; and (vi) a third electric power trace extending between, and connected electrically to, the modular receptacle connector and the heat producing element; and a local controller module comprising said power controlling circuit and a mating modular plug connector configured for mating, releasable connection with the modular receptacle connector of the socket in a manner that connects the power controlling circuit electrically in a releasable manner between the second electric power trace and the third electric power trace for controlling the electric power to the heat producing element.

2. The improvement of claim 1, wherein the inlet daisy chain connector includes a plug connector.

3. The improvement of claim 1, wherein the outlet daisy chain connector includes a plug connector.

4. The improvement of claim 1, wherein said power controlling circuit includes a power switching device connected electrically between the second electric trace and the third electric trace for controlling electric power to the heat producing element.

5. The improvement of claim 4, wherein said power controlling circuit includes a local controller process circuit associated with the power switching device to control operation of the power switching device in a manner that causes the heat producing element to produce heat to maintain said pipe at a desired temperature.

6. The improvement of claim 5, wherein said power controlling circuit is powered by a low voltage DC power supply, which is remote from the local controller module and from the heat producing element so that heat produced by the heat producing element does not affect the low voltage DC power supply.

7. The improvement of claim 6, wherein said socket also comprises a pair of low voltage traces extending between the inlet daisy chain connector and the outlet daisy chain connector and to the modular receptacle connector, and wherein said local controller module also comprises electrical connections between the local controller process circuit and the modular plug connector such that connection of the modular plug connector of the local controller module to the modular receptacle connector of the socket also connects the local controller process circuit to the low voltage DC power traces in the socket.

8. The improvement of claim 5, including a temperature sensor associated with the pipe heater and connected to the local controller process circuit, said temperature sensor being capable of producing signals that are indicative of temperature of the pipe heater and said local controller process circuit being capable of utilizing such signals for comparing the temperature of the pipe heater to a set point temperature and controlling the power switching device in a manner that causes the heat producing element to produce heat as needed to maintain the temperature of the pipe heater at or near the set point temperature.

9. The improvement of claim 5, wherein the local controller process circuit is capable of receiving and processing temperature control signals from a remote source for controlling the power switching device in accordance with such control signals from the remote source.

10. The improvement of claim 5, including a temperature sensor associated with the pipe heater and connected to the local controller process circuit, said temperature sensor being capable of producing signals that are indicative of temperature of the pipe heater and said local controller process circuit being capable of receiving and processing such signals for transmission of temperature data indicative of the temperature of the pipe heater to a base unit located remotely from the local controller module.

11. The improvement of claim 8, wherein the temperature sensor is positioned adjacent the heat producing element.

12. The improvement of claim 8, including a pair of electrically conductive temperature traces extending through the socket from the temperature sensor to the modular receptacle connector, and wherein the local controller module includes electrically conductive connections from the local controller process circuit to the modular plug connector such that connection of the modular plug connector of the local controller module to the modular receptacle connector of the socket also electrically connects the local controller process circuit to the temperature sensor.

13. The improvement of claim 8, wherein the local controller process circuit is capable of receiving set point temperature signals from a remote source and of utilizing such set point temperature signals for determination of the set point temperature.

14. The improvement of claim 8, wherein the local controller process circuit is capable of transmitting data indicative of pipe heater temperature to a remote unit.

15. The improvement of claim 13, including at least one electrically conductive data trace extending between the inlet daisy chain connector and the outlet daisy chain connector and to the modular receptacle connector, and wherein said local controller module also comprises an electrically conductive data connection between the local controller process circuit and the modular plug connector such that connection of the modular plug connector of the local controller module to the modular receptacle connector of the socket also connects, the local controller process circuit to the data trace in the socket.

16. The improvement of claim 14, including at least one electrically conductive data trace extending between the inlet daisy chain connector and the outlet daisy chain connector and to the modular receptacle connector, and wherein said local controller module also comprises an electrically conductive data connection between the local controller process circuit and the modular plug connector such that connection of the modular plug connector of the local controller module to the modular receptacle connector of the socket also connects the local controller process circuit to the data trace in the socket.

17. In pipe heater apparatus comprising a plurality of pipe heaters configured for mounting on one or more pipes, wherein each of said pipe heaters has a heat producing element that is capable of producing heat from electric power derived from line voltage electricity and a power controlling circuit for controlling the electric power to the heat producing element, the improvement comprising:

a socket on each of said pipe heaters comprising: (i) an inlet daisy chain connector; (ii) an outlet daisy chain connector; (iii) a module receptacle connector; (iv) line voltage power traces extending from the inlet daisy chain connector to the outlet daisy chain connector, to the module connector, and to the heat producing element; (v) low voltage DC power traces extending from the inlet daisy chain connector to the outlet daisy chain connector and to the module connector; and (vi) at least one data trace extending from the inlet daisy chain connector to the outlet daisy chain connector;

a plurality of daisy chain cords extending between and releasably connected to respective ones of the sockets of the pipe heaters, wherein each of the daisy chain connectors has daisy chain connectors has line voltage power conductors, low voltage DC power conductors and at least one data conductor that connect with the line voltage power traces, low voltage DC power traces, and the data trace in the socket when the daisy chain cords are connected to the daisy chain inlet and/or outlet connectors of the socket such that a combination of a plurality of daisy chain cords connecting together the sockets of a plurality of pipe heaters constitutes a continuous line voltage power circuit, a continuous low voltage DC power circuit, and a continuous data circuit extending to and through the plurality of pipe heaters; and a local controller module at each of the pipe heaters comprising; (i) a power switch device for controlling electric power to the heat producing element; (ii) a local controller process circuit for controlling the power switch device; and (iii) a module plug connector that is configured for mating, releasable physical and electrical connection with the module receptacle connector of a socket in such a manner that physical plug-in connection of the local controller module to the socket also effects simultaneous electrical connection of the power switch device to the line voltage power traces and to the heat producing device and simultaneous electrical connection of the local controller process circuit to the low voltage DC power traces and to the data trace.

18. The improvement of claim 17, including a base unit that has voltage electric power, low voltage DC power, a data transmitter and receiver, and a daisy chain connector configured for electrical connection of the line voltage electric power, the low voltage DC power, and the data transmitter and receiver to at least one of the daisy chain cords, which is also connected to the socket to of least one oft e pipe heaters.

19. The improvements of claim 18, including a temperature sensor at each of the pipe heaters that produces a signal, which is indicative of a temperature at such pipe heater.

20. The improvement of claim 19, wherein the local controller process circuit is capable of comparing the temperature at the pipe heater to a set point temperature and of controlling the power switch device to cause the heat producing element to produce sufficient heat to maintain the temperature at the pipe heater at or near the set point temperature.

21. The improvement of claim 20, wherein the base unit is capable of transmitting the set point temperature onto the data conductor of the daisy chain, and wherein the local controller process circuit of each local controller module is capable of receiving such set point from the data trace of the socket.

22. The improvement of claim 21, wherein the local controller process circuit is capable of transmitting the pipe beater temperature data onto the data trace in the socket, and wherein the base unit is capable of receiving the pipe heater temperature data from the daisy chain cord data conductor.

23. A method of controlling a plurality of pipe heaters, each of which has a heat producing element, comprising:

providing a socket on each pipe heater with line voltage electric power, with low voltage DC power from a source remote from the pipe heaters, and with data communications, all through a plurality of daisy chain cords, each of which comprises line voltage power conductors, low voltage DC power conductors, and at least one data communication conductor so that only one of such daisy chain cords is needed between respective adjacent pipe heaters;

providing a local control module for each of the pipe heaters with temperature data processing functions by a local controller processing circuit for comparing temperatures sensed at the pipe heater with a set point temperature and with a power switching device for controlling line voltage electric power to the heat producing device in response to variations of the temperatures sensed at the pipe heater in relation to the set point temperature; and connecting the line voltage power controlled by the power switching device to the heat producing element and connecting the low voltage DC power and the data communications to the local controller processing circuit by plugging the local controller module into the socket.

* * * * *